(12) United States Patent
Yasuda

(10) Patent No.: US 6,389,399 B1  
(45) Date of Patent: May 14, 2002

(54) AUDIO DUBBING SYSTEM FOR DIGITAL AUDIO RECORDER

(75) Inventor: Naotaka Yasuda, Kawachinagano (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/363,654

(22) Filed: Jul. 30, 1999

(30) Foreign Application Priority Data

Aug. 5, 1998 (JP) .......................................... 10-222128

(51) Int. Cl.[7] .................. G10L 21/00; G10L 11/00; G10L 19/00
(52) U.S. Cl. .................. 704/500; 704/278; 704/270
(58) Field of Search ................. 704/270, 500, 704/200, 201, 501, 278

(56) References Cited

U.S. PATENT DOCUMENTS

| | | | |
|---|---|---|---|
| 4,851,931 A | | 7/1989 | Parker et al. .................. 360/15 |
| 5,012,334 A | * | 4/1991 | Etra ........................... 348/107 |
| 5,034,914 A | | 7/1991 | Osterlund .................... 364/900 |
| 5,633,839 A | | 5/1997 | Alexander et al. ............. 369/30 |
| 5,751,678 A | * | 5/1998 | Tanaka ......................... 369/84 |
| 5,940,232 A | * | 8/1999 | Okuyama ..................... 360/15 |
| 6,137,642 A | * | 10/2000 | Inoue ........................... 360/15 |

FOREIGN PATENT DOCUMENTS

| | | | | |
|---|---|---|---|---|
| JP | 7-6505 | | 1/1995 | |
| JP | 07-041786 A | * | 7/1995 | ........... G11B/27/02 |
| JP | 8-96487 | | 4/1996 | |
| JP | 10-191219 | | 7/1998 | |
| JP | 10-222128 | * | 8/1998 | ........... G11B/27/00 |
| WO | WO 95/12250 | | 5/1995 | |
| WO | WO-95/12250 A1 | * | 5/1995 | ............ H04B/1/20 |

OTHER PUBLICATIONS

E.W. Williams, "The CD–ROM and Optical Disc Recording System", Published 1994 by Oxford University Press, pp. 114–117.

Copy of Japanese Patent Office Action for corresponding Japanese Patent Application No. 10–222128 dated Nov. 16, 1999, along with certified translation.

A Secret Technique of CD–R/RW Burn–in, DOS/V Magazine, Jun. 15, 1998, Softbank Corp., vol. 7, No. 12—pp. 156–171.

\* cited by examiner

*Primary Examiner*—Richemond Dorvil
*Assistant Examiner*—Daniel A Nolan
(74) *Attorney, Agent, or Firm*—Armstrong, Westerman & Hattori, LLP

(57) ABSTRACT

An audio dubbing system which is composed of an MD recorder 5 capable of recording digital data obtained by converting audio signals of respective tracks from one or plural CD(s) onto MD, and a personal computer 1 for causing the MD recorder 5 to record the digital audio signals, and in which the personal computer 1 is connected to a CD-ROM drive 12 for reading the audio signals from the CD(s) as digital data and to a hard disk drive 13 for storing the digital data read by the CD-ROM drive 12.

1 Claim, 8 Drawing Sheets

FIG. 4

TRACK INFORMATION OF
CD(1):TI(1)

| TRACK | TIME |
|---|---|
| 1 | 15:10 |
| 2 | 0:15 |
| 3 | 5:05 |
| 4 | 7:56 |
| 5 | 3:33 |
| 6 | 12:51 |
| 7 | 6:36 |
| 8 | 1:39 |

TRACK INFORMATION OF
CD(2):TI(2)

| TRACK | TIME |
|---|---|
| 1 | 5:11 |
| 2 | 10:15 |
| 3 | 5:45 |
| 4 | 3:06 |
| 5 | 1:39 |
| 6 | 2:50 |
| 7 | 5:46 |
| 8 | 11:49 |

TRACK INFORMATION OF
CD(3):TI(3)

| TRACK | TIME |
|---|---|
| 1 | 5:19 |
| 2 | 4:14 |
| 3 | 3:03 |
| 4 | 2:54 |
| 5 | 1:13 |
| 6 | 8:51 |
| 7 | 3:11 |
| 8 | 1:59 |

TRACK INFORMATION OF
CD(4):TI(4)

| TRACK | TIME |
|---|---|
| 1 | 3:06 |
| 2 | 2:16 |
| 3 | 4:41 |
| 4 | 6:07 |
| 5 | 2:28 |
| 6 | 11:00 |
| 7 | 1:31 |
| 8 | 1:17 |

TOC(v) OF VIRTUAL
ORIGINAL DISK

| DISK TITLE | | |
|---|---|---|
| TRACK | TIME | NAME |
| 1 | 5:05 | NAME1 |
| 2 | 10:15 | NAME2 |
| 3 | 3:06 | NAME3 |
| 4 | 3:03 | NAME4 |
| 5 | 1:13 | NAME5 |
| 6 | 8:51 | NAME6 |
| 7 | 3:06 | NAME7 |
| 8 | 1:17 | NAME8 |

↓

RECORD IN
MD RECORDER

FIG. 7

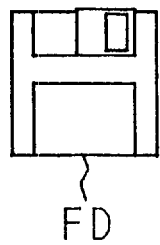

FD

| PC11: TO READ AUDIO SIGNALS OF TRACKS RECORDED ON INDIVIDUAL CDs THEREFROM AS DIGITAL DATA |
| --- |
| PC12: TO STORE DATA READ FROM CDs ONTO HD 13 |
| PC13: TO ACCEPT SELECTION OF DESIRED ONE OR PLURAL TRACK(s) FROM DATA STORED ON HD 13 |
| PC14: TO CREATE VIRTUAL ORIGINAL MD IN WHICH DATA OF SELECTED TRACKS ARE USED AS TRACKS OF AUDIO SIGNALS TO BE RECORDED |
| PC15: TO READ DATA OF TRACKS COMPOSING VIRTUAL ORIGINAL MD FROM HD 13 |
| PC16: TO OUTPUT DATA READ FROM HD 13 AS AUDIO SIGNALS TO MD RECORDER 5 AND RECORD THEM ON MD |

| PC21: TO COMPRESS AND ENCODE READ DIGITAL DATA, AND STORE THEM ONTO HD 13 |
| --- |
| PC22: TO EXPAND AND DECODE COMPRESSED AND ENCODED DATA STORED ON HD 13 AND READ THEM |

| PC31: TO CALCULATE TOTAL RECORDING TIME OF DATA OF TRACKS STORED ON HD 13 AS AUDIO SIGNAL |
| --- |
| PC32: TO JUDGE AS TO WHETHER OR NOT RECORDING TO MD IS POSSIBLE BASED ON CALCULATED TOTAL TIME |

AUDIO DUBBING SYSTEM FOR DIGITAL AUDIO RECORDER

BACKGROUND OF THE INVENTION

1. Field of the Invention

The present invention relates to an audio dubbing system utilizing recording media such as MD, writable CD or DVD on which digital data can be recorded by a personal computer, a digital audio recorder as a component of the audio dubbing system and a recording medium on which computer programs to be used for a personal computer are recorded.

2. Description of the Related Art

An MD (Mini Disk), which is a magneto-optical disk on which information obtained by converting music into digital data, is in common use. An MD is marketed in such a state that digital information, such as music information, is previously recorded on an optical disk or in a state of a so-called free magneto-optical disk on which a user can record desired digital information using an MD recorder. Therefore, there are many users who buy such a blank disk and create an original MD, on which desired musical pieces (tracks) are recorded in a desired order, using digital recording media such as MD, CD and DAT, as well as analog recording media such as a record and audio cassette tape on which music information has been already recorded as a source of dubbing, and reproduce and listen to the original MD in/to a portable or car-stored MD reproducing apparatus.

In the case where users utilize the MD in the above manner, a free recordable disk is set into a recorder (MD deck) which can execute recording on an MD and a CD is set into a reproducing apparatus connected with the recorder, for example, a CD player, so that dubbing is executed. At this time, a troublesome operation is not required in the case where one whole CD is dubbed directly onto an MD, but in the case where one or more musical pieces are selected from plural CDs so as to be dubbed successively on one MD, namely, a so-called original MD is created, the following troublesome operations are required.

Namely, one or more musical pieces are selected from one CD so as to be reproduced, and accordingly recording in an MD deck is started. Just when the dubbing from the one CD is completed, the recording onto the MD is temporarily stopped (paused), and the set CD is replaced by the other CD. When the above operation is repeated, a plurality of musical pieces (tracks) which are desired by the user are dubbed on the MD. Furthermore, TOC (Table Of Contents) is rewritten so that the order of the musical pieces (tracks) can be rearranged in a desired order, and data such as names and players of the respective musical pieces (tracks) are inputted so as to be capable of being written into the TOC. However, buttons, dials or the like of a remote controller of the MD deck are used for these operations, and thus characters cannot be inputted by a keyboard.

In the case where these operations are performed, because the dubbing from the CDs containing the respective pieces (tracks) onto the MD can be executed only in real time, about one hour is required only for this operation, and because the data such as names and players of the pieces are inputted normally not by a keyboard but by the remote controller of the MD deck, this dubbing becomes a troublesome operation.

As a result, an MD deck, in which an order of musical pieces (tracks) is rearranged, and names and players of the pieces are inputted by a personal computer so as to be capable of being written into TOC of an MD, has been already put to practical use. However, even in such an MD deck, because musical pieces (tracks) should be dubbed from a CD onto an MD in a conventional manner, problems such that a long time is required and dubbing should be executed while CDs are replaced with each other are not solved.

In addition, in the case where the dubbing is executed in the above manner, besides the recorder for a recording medium as a dubbing destination, at least a reproducing apparatus, which is capable of reproducing a digital or analog audio signal from a recording medium and outputting the signal through a line, is required.

SUMMARY OF THE INVENTION

The present invention has been achieved with such points in view and utilizes a personal computer which is remarkably in common use so as to solve the above problems.

One object of the present invention is to provide a dubbing system which is structured by combining a personal computer equipped with a reading apparatus, such as a CD-ROM drive, capable of reading audio information recorded on a recording medium, such as a CD, and a digital audio recorder, such as an MD deck, which can execute reproduction, stop (pause), rewind, recording, editing and the like from the personal computer utilizing software. As a result, a reproducing apparatus is not necessary, and when desired musical pieces (tracks) are selected from musical pieces (tracks) read from plural recording media on a display of the personal computer so as to be recorded on one recording medium, an original recording medium which is desired by an user can be created easily. Moreover, another object of the invention is to provide a recording medium on which a computer program for such a personal computer are recorded.

An audio dubbing system of the present invention includes a computer for outputting a series of audio signals and control signals which instruct starting and end of recording the audio signals; and a digital audio recorder for recording the series of audio signals outputted from the computer as digital data in one unit onto a recording medium according to the control signals outputted from the computer.

In such an audio dubbing system, because a series of audio signals outputted from the computer are recorded by the digital audio recorder onto a recording medium as digital data in one unit according to the control signals outputted from the computer, the dubbing is possible by outputting the audio signals from the computer.

In addition to the above, in an audio dubbing system of the present invention, the computer comprises reading means for reading the audio signals as digital data; and storing means for storing the digital data read by the reading means.

In such an audio dubbing system of the present invention, when the audio signals are read and stored in the computer previously, desired dubbing is possible.

In addition to the above constitution, in an audio dubbing system of the present invention, the computer compresses and encodes the audio signals read by the reading means so as to store them in the storing means.

In such an audio dubbing system of the present invention, a use capacity of a storage capacity in the storing means of the computer is suppressed.

In addition to the above constitution, in an audio dubbing system of the present invention, the computer outputs the digital data stored in the storing means as analog or digital audio signals in real time.

In such an audio dubbing system of the present invention, the audio signals can be recorded by a normal recorder in real time.

In addition to the above constitution, an audio dubbing system of the present invention, the computer expands and decodes the digital data stored in the storing means so as to output them as analog or digital audio signals.

In such an audio dubbing system of the present invention, a use capacity of the storage capacity in the storing means of the computer is suppressed.

In addition to the above constitution, in an audio dubbing system of the present invention, the computer comprises recording time calculating means for calculating a total recording time of the data stored in the storing means as audio signals; and judging means for judging as to whether or not the digital audio recorder can execute recording onto a recording medium based on the total time calculated by the recording time calculating means.

In such an audio dubbing system of the present invention, the dubbing can be executed within a range of a capacity of the recording medium as the dubbing destination.

In addition to the above constitution, in an audio dubbing system of the present invention, when the reading means reads the audio signals as digital data from the recording medium, the computer makes the reading means read also content information representing contents of the series of audio signals, and makes the storing means store the content information thereon.

In such an audio dubbing system of the present invention, the respective pieces of the content information can be reused in the computer.

In addition to the above constitution, in an audio dubbing system of the present invention, the reading means is a disk drive, and the digital audio recorder is an MD recorder.

In such an audio dubbing system of the present invention, desired dubbing can be executed from plural music CDs to one MD.

Further, a digital audio recorder of the present invention records a series of audio signals outputted from a computer as digital data in one unit on a recording medium according to control signals which instruct starting and end of recording outputted from the computer.

In such a digital audio recorder of the present invention, because the audio signals are recorded on a recording medium according to control signals which instruct starting and end of recording outputted from the computer, the dubbing is executed in a state which is previously created by using the computer.

The above and further objects and features of the invention will more fully be apparent from the following detailed description with accompanying drawings.

BRIEF DESCRIPTION OF THE DRAWINGS

FIG. 4 is a schematic drawing showing an operational procedure by the audio dubbing system of the present invention;

FIG. 7 is a schematic drawing showing contents of program codes recorded on a recording medium of the present invention.

DESCRIPTION OF THE PREFERRED EMBODIMENTS

There will be described below embodiments of the present invention with reference to the drawings. Here, in the following embodiments, a personal computer is utilized as a computer, and a music CD as a recording medium which is set into a CD-ROM drive as a disk drive of the personal computer is used as a source and musical pieces are to be dubbed onto an MD as a recording medium which is set into a portable MD recorder as a digital audio recorder.

Figure 1:
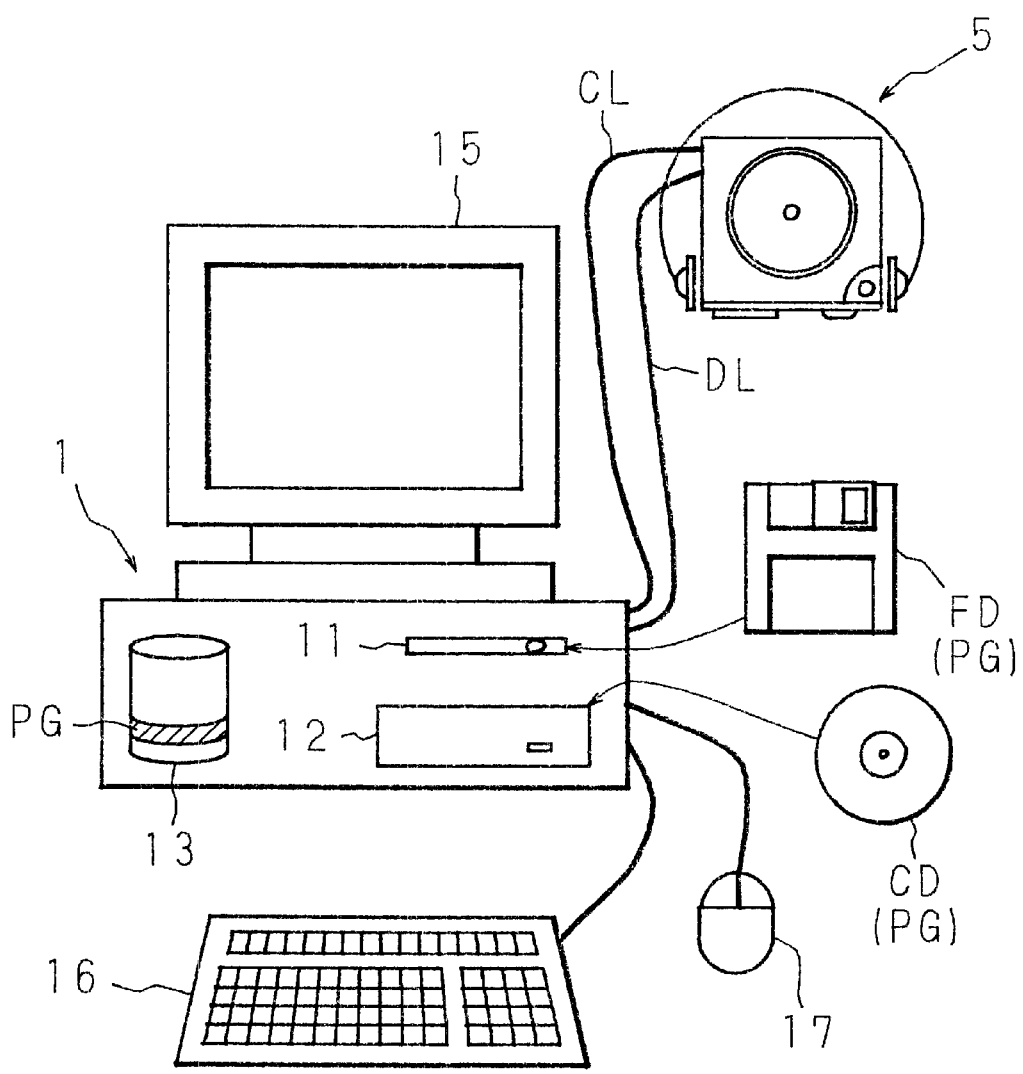
FIG. 1 is a schematic drawing showing a constitutional example of a whole audio dubbing system of the present invention.

FIG. 1 is a schematic drawing showing a constitutional example of a whole dubbing system of the present invention. In FIG. 1, a reference numeral 1 denotes a personal computer, and 5 denotes a portable MD recorder having recording and reproduction functions. Here, the personal computer 1 and the MD recorder 5 are connected with each other via a control signal line CL for transmitting a control signal for controlling the MD recorder 5 by a software installed in the personal computer 1, and via a data signal line DL for transmitting data to be recorded such as an audio signal and TOC from the personal computer 1 to the MD recorder 5. However, one signal line can be used in common as both the signal lines CL and DL.

In addition, the personal computer 1 is provided with a flexible disk drive (FDD) 11 and a CD-ROM drive (CDD) 12 for reading recorded contents (program codes) from a flexible disk FD or a CD-ROM CD on which a computer program PG is recorded. Moreover, a reference numeral 13 denotes a hard disk drive (hereinafter "HDD") as a non-volatile storing means, and it stores respective program codes of the computer programs PG read from the flexible disk FD or CD-ROM CD.

Here, the CDD 12 serves also as reading means for reading music information, namely, an audio signal from CD on which the audio signal was recorded, and the HDD 13 serves also as storing means for storing the audio signal read by the CDD 12. Here, FIG. 1 shows a constitutional example that the CDD 12 and HDD 13 are contained in the personal computer 1, but needless to say, they may be external apparatuses connected via SCSI. Furthermore, needless to say, instead of the HDD 13, another storage apparatus such as an internal RAM may be used.

Here, a reference numeral 15 denotes a CRT. display as displaying means, and reference numerals 16 and 17 denote, respectively, a keyboard and mouse as inputting means and a pointing device. However, needless to say, various recording media other than the flexible disk FD and CD-ROM CD may be utilized.

Figure 2:
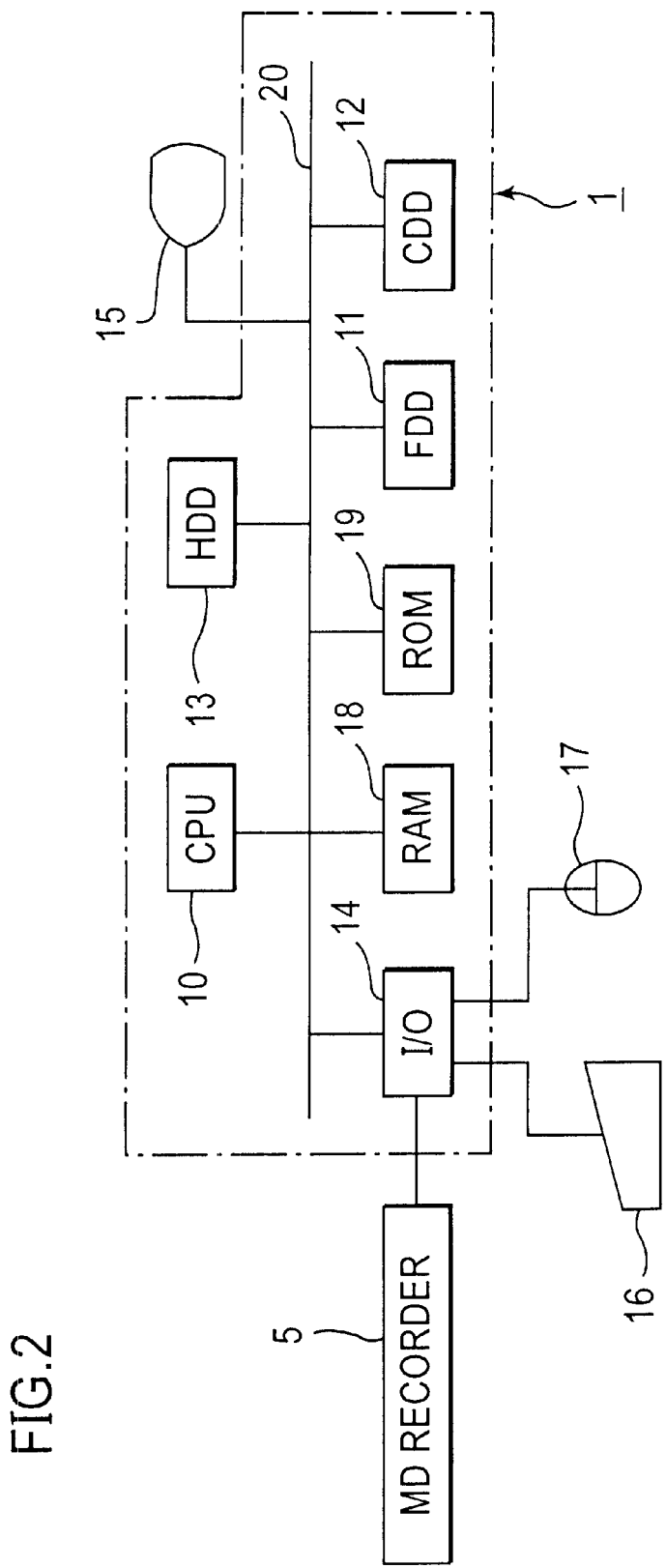
FIG. 2 is a block diagram showing an internal constitutional example of a personal computer which is a component of the audio dubbing system of the present invention.

FIG. 2 is a block diagram showing an example of an internal constitution of the personal computer 1, a CPU 10 is connected with the FDD 11, CDD 12, HDD 13, a CRT display 15 and the like via a bus 20. Moreover, the keyboard 16 and mouse 17 are connected with the bus 20 via an interface (I/O) 14, and the MD recorder 5 is also connected with the bus 20 via the interface 14. Here, reference numerals 18 and 19 denote, respectively, RAM and ROM as storing means.

The program codes of the computer programs PG, which were read from the flexible disk FD by the FDD 11 or from the CD-ROM CD by the CD-ROM drive 12, are written into the HDD 13, for example, and are temporarily stored therein. When the program codes of the computer programs PG are executed, the program codes are read from HDD 13 so as to be transmitted to the RAM 18 and stored therein.

Here, the flexible disk FD and/or CD-ROM CD are used as the recording medium for the computer programs PG, but the recording medium is not limited to them, so needless to say, a magnetic tape, magneto-optical disk and the like can be also utilized by combining them with a suitable drive (reading means).

Figure 3:
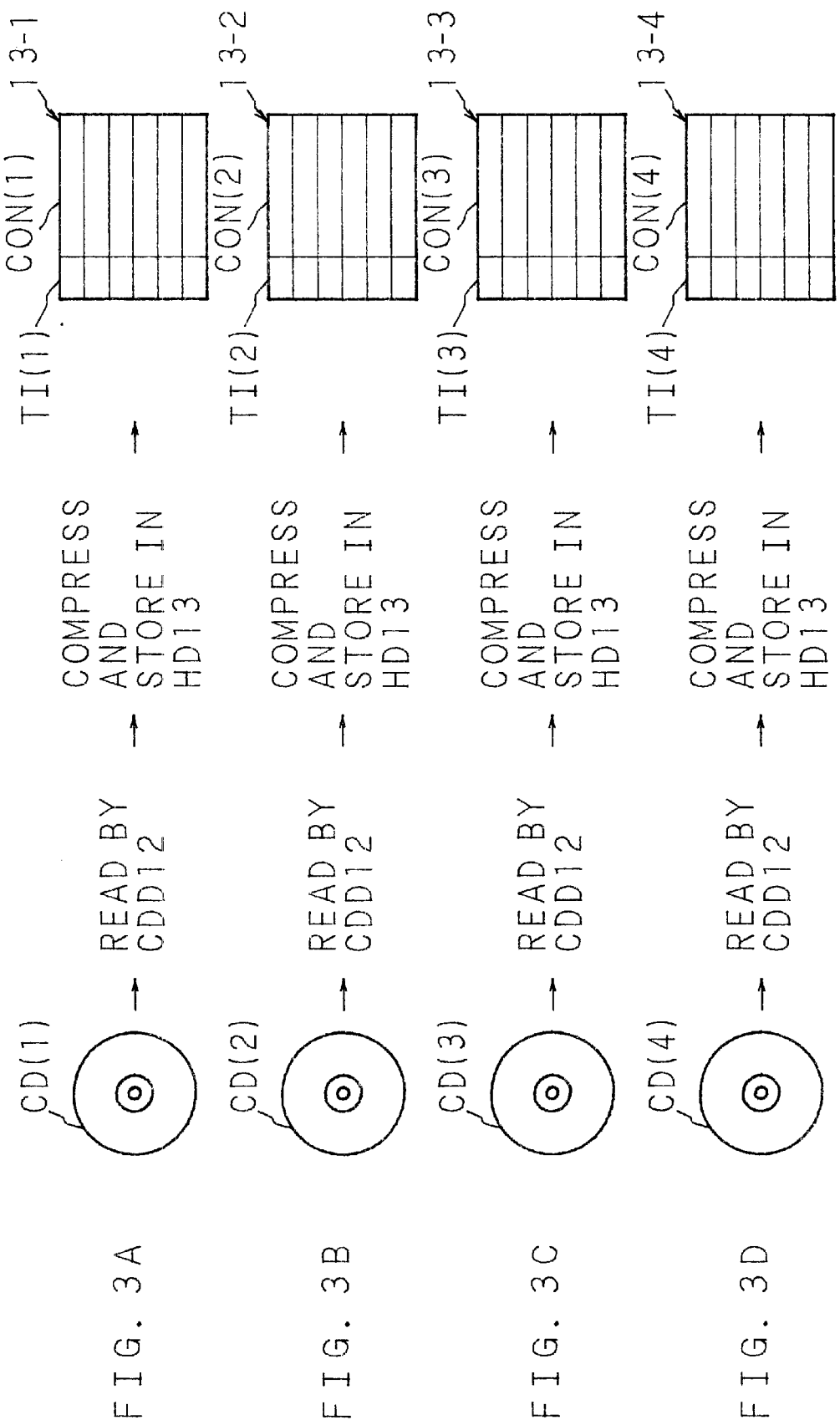
FIG. 3A, FIG. 3B, FIG. 3C and FIG. 3D are schematic drawings showing an operational procedure by the audio dubbing system of the present invention.
Figure 5:
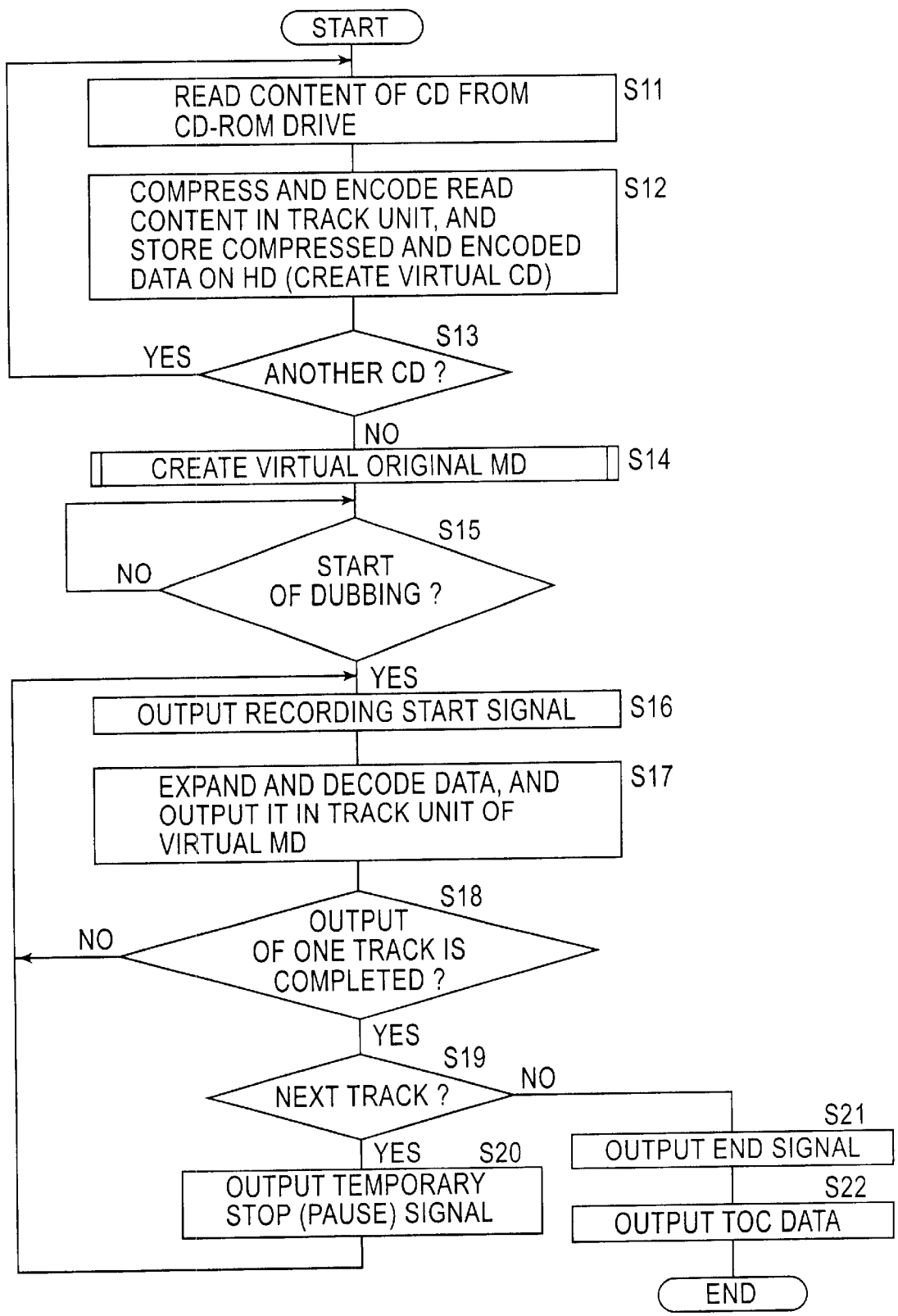
FIG. 5 is a flow chart showing the operational procedure by the audio dubbing system of the present invention.
Figure 6:
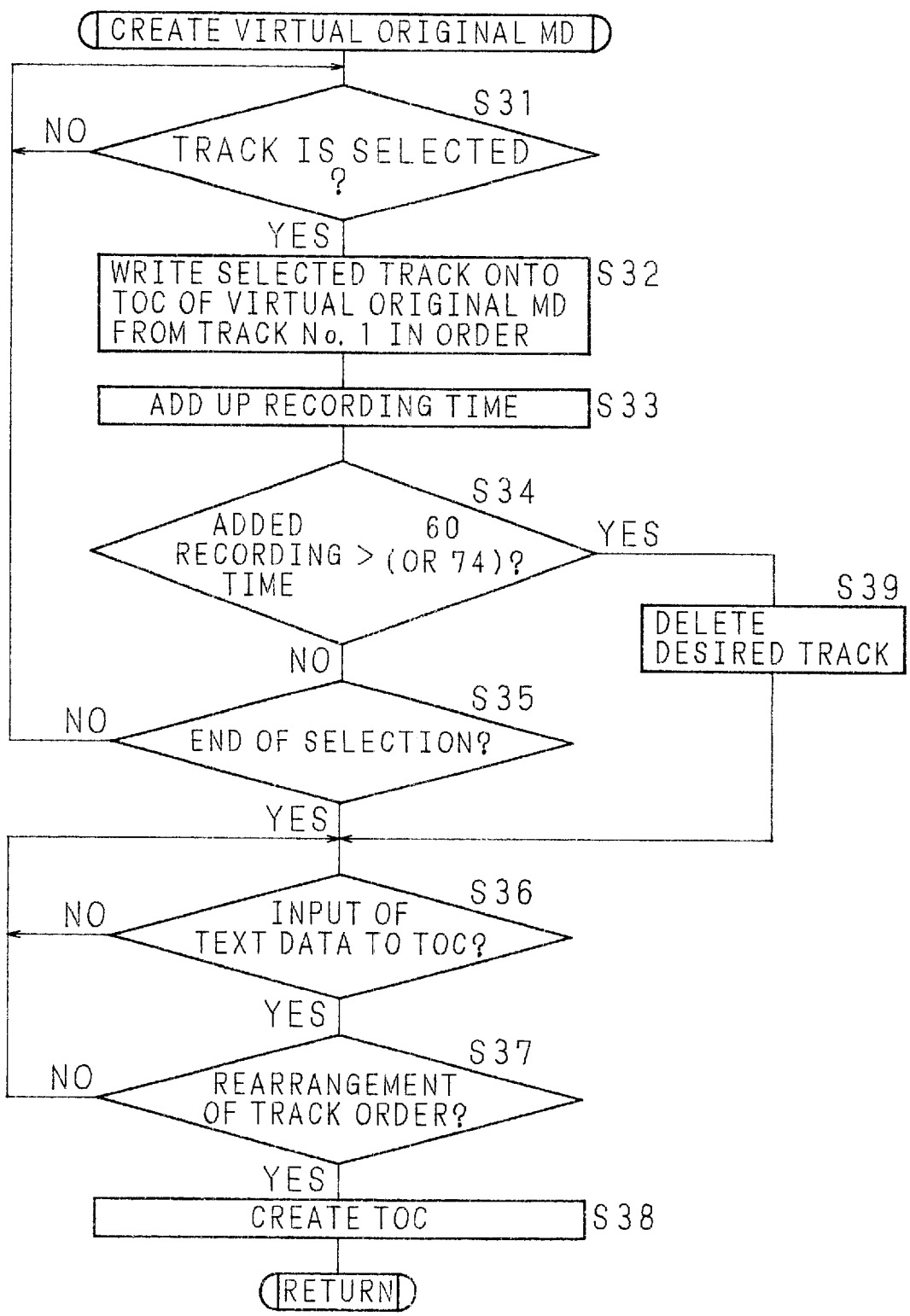
FIG. 6 is a flow chart showing the operational procedure by the audio dubbing system of the present invention.

The following will describe an operation of the audio dubbing system of the present invention having the above-mentioned structure with reference to FIG. 3 through FIG. 6. Here, FIG. 3 and FIG. 4 are schematic drawings showing a procedure for dubbing from a music CD to MD by means of the dubbing system of the present invention, and FIG. 5 and FIG. 6 are flow charts showing the processing procedure by the personal computer 1. Here, the following examples show a case where a user selects desired musical pieces (tracks) from four CDs on which plural musical pieces (tracks) are recorded so as to dub the selected tracks onto one MD.

At first, as shown in FIG. 3A, when the user sets a desired one CD (hereinafter, referred to as CD (1)) among the four CDs into the CD-ROM drive (CDD) 12 of the personal computer 1, all the information recorded on the CD (1), namely, audio signals (hereinafter, CON (1)) and track information (hereinafter, TI (1)) of the plural musical pieces (tracks) are read (step S11), and are compressed and encoded so as to be recorded on the HDD 13 and retained therein (step S12). The information of one unit, which is read from one CD and recorded on the HDD 13 in such a manner, is called as a virtual CD. Therefore, the virtual CD, which is read from the first CD (1) and retained in the HDD 13, is represented by a reference numeral 13-1. Here, track numbers and recording times of the musical pieces (tracks) recorded on the respective CDs are recorded in the track information TI.

In a similar manner, as shown in FIG. 3B, FIG. 3C and FIG. 3D, information recorded on second, third and fourth CD (2), CD (3) and CD (4) are also read (step S13), and the respective pieces of information are retained in the HDD 13 as virtual CDs 13-2, 13-3 and 13-4. Needless to say, the virtual CDs 13-2, 13-3 and 13-4 include, respectively, audio signals CON (2), CON (3) and CON (4), and track information TI (2), TI (3) and TI (4) of the musical pieces (tracks) recorded on the respective CDs.

Here, in the present embodiment, when the audio signal is read from CD by the CD-ROM drive 12 and recorded on the HDD 13, the audio signal is compressed and encoded by various methods. This is because data of about 600 MB are generally recorded on a music CD, and thus in the case where all the contents of the four CDs are recorded on the HDD 13, as in the present embodiment, a data amount becomes not less than about 2 GB and a use capacity of the HDD 13 is suppressed.

After all the pieces of information recorded on the four CDs are written and retained in the HDD 13, and the virtual CDs 13-1, 13-2, 13-3 and 13-4 are created in the above manner, a virtual original MD is created (step S14). The procedure for creating this virtual original MD is shown in the flow chart of FIG. 6.

At first, as shown in FIG. 4, since the respective virtual CDs are displayed on the CRT display 15, track numbers of the virtual CDs 13-1, 13-2, 13-3 and 13-4 corresponding to the musical pieces (tracks) desired by the user are selected (step S31). For example, as shown in the schematic drawing of FIG. 4, in the case where the user desires a piece of the track number 3 in the first virtual CD (1), pieces of the track numbers 2 and 4 in the second virtual CD (2), pieces of the track numbers 3, 5 and 6 in the third virtual CD (3), and pieces of the track numbers 1 and 8 in the fourth virtual CD (4), the user selects the respective track numbers by clicking the mouse 17 on a screen of the CRT display 15. As a result, text information, which specifies the musical pieces (tracks) corresponding to the selected, namely, clicked track numbers in the virtual CDs, is written in TOC (V) of the virtual original MD (step S32). However, the track numbers in the virtual original MD and recording times of the selected tracks are displayed on the CRT display 15.

At this time, every time one musical piece (track) is designated, the recording time of the virtual original MD is added up (step S33), and a judgment is made as to whether or not the recording time exceeds 60 minutes (or 74 minutes) which is a recordable time of the MD set into the MD recorder 5 (step S34). When the recording time of the virtual original MD exceeds 60 minutes (or 74 minutes) ("YES" at step S35), this state is displayed on the CRT display 15. As a result, when the user performs a predetermined operation, a desired track can be deleted (step S39).

When the above steps are repeated and the selection of tracks is completed, in other words, the selection of the musical pieces (tracks) is completed ("YES" at step S35), names, players of the pieces and the like can be inputted according to the respective tracks of TOC in the virtual original MD by using the keyboard 16 of the personal computer 1 (step S36). However, in the case where when the audio signal is read from the CD to the HDD 13, text information such as the names, players of the pieces and the like have been already included in the tracks respectively, just when the respective tracks are selected, the text information (names, players of the pieces and the like) are displayed on the corresponding tracks of TOC of the virtual original MD on the CRT display 15. Therefore, the text information can be directly reused or processed so as to be reused. As such a CD, "CD plus" or "Enhanced Music CD" are known.

Further, when the individual tracks are dragged and dropped by the mouse 17 in TOC of the virtual original MD displayed on the CRT display 15, the order of the pieces can be rearranged (step S37).

Since TOC of the virtual original MD is created (step S38) and the virtual original MD is finished in the above manner, when the user directs starting of the dubbing by means of the operation of the keyboard 16 or mouse 17 ("YES" at step S15), a recording start signal is outputted from the personal computer 1 to the MD recorder 5 via the control signal line CL (step S16), and the data of TOC of the virtual original MD and sound data of the musical pieces (tracks) corresponding to the contents of the TOC are read from the HDD 13 so as to be outputted to the MD recorder 5 via the data signal line DL (step S17). As a result, in the MD recorder 5, the audio signal outputted from the personal computer 1 is converted into digital data which conform to a format for MD so as to be recorded on the set MD.

However, needless to say, the sequence returns from the step S15 to the step S14 so that the virtual original MD can be created again.

Here, in the case where the data of the musical pieces (tracks) are compressed and stored in the HDD 13, the data are expanded and restored in the personal computer 1 so as to be outputted to the MD recorder 5. Moreover, because it is necessary to input an audio signal to the MD recorder 5 at actual time, the above data expanding and restoring process should be executed without interruption.

Because output of one musical piece, namely, an audio signal for one track is completed ("YES" at step S18), when a next track exists ("YES" at step S19), a temporary stop (pause) signal is outputted from the personal computer 1 via the control signal line CL (step S20) so that the sequence is returned to the above step S16 with a suitable interval. When the steps S16 through 20 are repeated, the audio signals of the tracks previously selected as tracks of the virtual original MD are outputted from the personal computer 1 so as to be recorded on the MD by the MD recorder 5.

When all the audio signals of the tracks selected as the tracks of the virtual original MD are outputted from the personal computer 1 to the MD recorder 5 ("NO" at step S19), an end signal is outputted (step S21) from the personal computer 1 via the control signal line CL, and then the TOC data are outputted via the data signal line DL (step S22). As a result, the MD recorder 5 writes the TOC data into TOC of the set MD. Thereafter, eight pieces are selected from the four CDs so as to be recorded on one MD, and thus the original MD is created.

Here, the above mentioned number of CDs as dubbing sources and number of pieces are one example, so they are not limited as long as they are within a maximum vale of a number of tracks capable of being recorded in MD within a MD recordable time. Moreover, the above embodiment described the example of the dubbing from CD to MD. Not only digital data recorded on CD, MD, DCT, DAT, DVD and the like but also data of sound tracks of a record, analog audio tape, LD (Laser Disk) and video tape, and data which is obtained by converting a sound and the like of television or radio broadcasting into digital data can be utilized as audio information in the dubbing sources as long as they can be captured as digital data into the personal computer. Not only an MD recorder but also recorders such as DAT, writable CD (CD-R, CD-RW) and DVD can be utilized as the dubbing destination.

Figure 8:
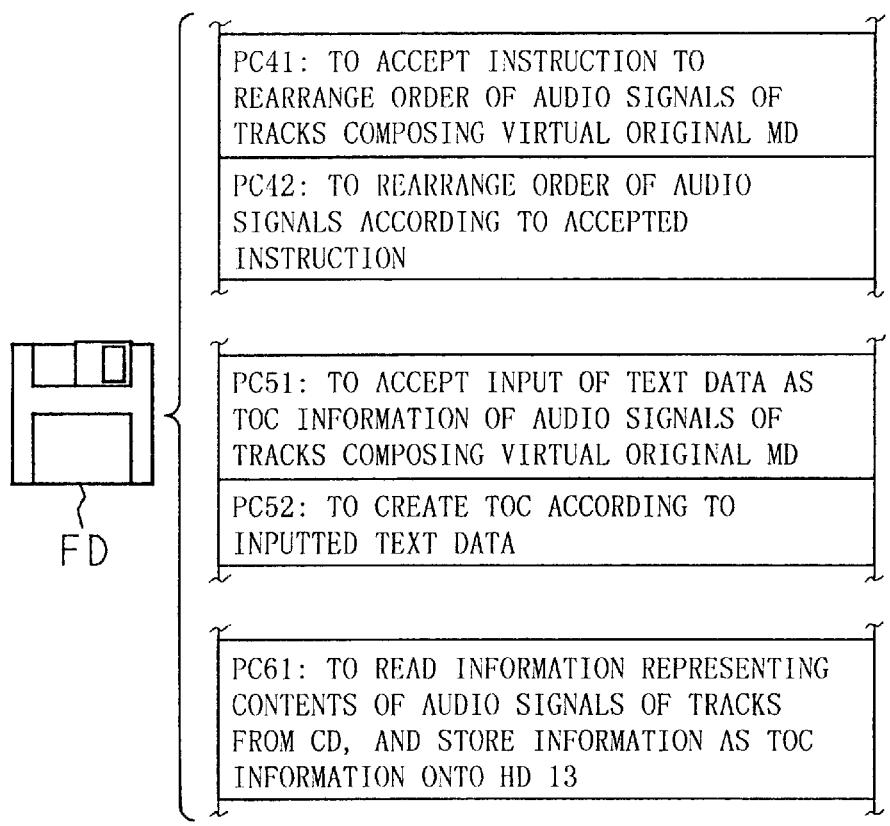
FIG. 8 is a schematic drawing showing contents of program codes recorded on a recording medium of the present invention.

FIG. 7 and FIG. 8 are schematic drawings showing contents of the computer programs PG recorded on a flexible disk FD as one example of the recording medium of the present invention.

On the flexible disk FD shown in FIG. 7, the following program codes, which compose computer programs for causing the personal computer 1 to selectively record desired one or plural track(s) of audio signals included in one or plural CD(s) onto one MD, are recorded. Namely, these codes are: a program code (PC11) for causing the personal computer 1 to read the audio signals of tracks recorded on the individual CDs therefrom as digital data; a program code (PC12) for causing the personal computer 1 to store the data read from the CDs onto the HDD 13; a program code (PC13) for causing the personal computer 1 to accept selection of a desired one or plural track(s) from the data stored on the HDD 13; a program code (PC 14) for causing the personal computer 1 to create the virtual original MD in which the data of the selected tracks are used as tracks of the audio signals to be recorded; a program code (PC15) for causing the personal computer 1 to read the data of the tracks composing the virtual original MD from the HDD 13; and a program code (PC16) for causing the personal computer 1 to output the data read from the HDD 13 as the audio signals to the MD recorder 5 and record them on the MD.

In addition, on the flexible disk FD, a program code (PC21) for causing the personal computer 1 to compress and encode the read digital data and store them onto the HDD 13, and a program code (PC22) for causing the personal computer 1 to expand and decode the compressed and encoded data stored on the HDD 13 and read them are further recorded.

Furthermore, on the flexible disk FD, a program code (PC31) for causing the personal computer 1 to calculate a total recording time of the data of the tracks stored on the HDD 13 as the audio signal, and a program code (PC32) for causing the personal computer 1 to judge as to whether or not the recording to MD is possible based on the calculated total time are further 5 recorded.

Further, on the flexible disk FD, a program code (PC41) for causing the personal computer 1 to accept an instruction to rearrange the order of the audio signals of the tracks composing the virtual original MD, and a program code (PC42) for causing the personal computer 1 to rearrange the order of the audio signals according to the accepted instruction are further recorded.

In addition, on the flexible disk FD, a program code (PC51) for causing the personal computer 1 to accept input of text data as TOC information of the audio signals of the tracks composing the virtual original MD, and a program code (PC52) for causing the personal computer 1 to create TOC according to the inputted text data are further recorded.

Moreover, on the flexible disk FD, a program code (PC61) for causing the personal computer 1 to read audio information representing the contents of the audio signals of the tracks from the CD, and store the text information as TOC information onto the HDD 13 is further recorded.

In the case where the flexible disk FD as a recording medium on which such program codes were recorded is set into the FDD 11, the program codes recorded on the flexible disk FD are temporarily stored on the HDD 13. Then, the program codes are read from the HDD 13 as the need arises so as to be stored on the RAM 18, and they are executed successively by the CPU 10 so that the personal computer 1 is operated as shown in the flow charts of FIG. 5 and FIG. 6.

Here, the above embodiment described the example that music is recorded in track unit onto MD as a digital recording medium by using the MD recorder as a digital audio recorder. However, besides the MD recorder, a CD recorder, DVD recorder, DAT recorder and the like which are capable of executing the recording onto a digital recording medium may be used, and an audio signal other than music may be recorded as long as it is recorded in track unit. Moreover, the above embodiment described the example that a music CD is used as a dubbing source, but various analog and digital sources can be utilized as long as data therein can be read as digital data by a computer.

According to the audio dubbing system, digital audio recorder and recording medium of the, present invention, since one digital audio recorder and personal computer can compose the dubbing system, it is not necessary to prepare an extra digital audio apparatus for dubbing.

In addition, audio signals (tracks) in desired units of a desired digital medium, more particularly, musical pieces are combined so that an original digital recording medium such as an MD can be created easily by operating the personal computer.

Furthermore, the information representing the contents of the tracks, i.e., so-called TOC can be created and rewritten easily, and the arrangement order of the tracks can be changed easily.

In addition, in the case where compressed and encoded data are stored in storing means such as a hard disk in the computer, a use capacity of the storing means can be suppressed.

Further, because a total recording time of audio signals to be dubbed is calculated in the computer, the dubbing can be executed within a range of the capacity of a recording medium as a dubbing destination.

Further, when audio signals are read as digital data from a recording medium as a dubbing source such as CD, because content audio information representing the contents of the audio signals is also read and stored in storing means, the content audio information can be reused in the computer.

In addition, in the case where a CD-ROM drive and MD recorder of the computer are used, desired dubbing can be executed from plural music CDs to one MD.

Further, according to the recording medium of the present invention, when the programs recorded on the recording medium are read by a general-purpose computer, the computer composing the above-mentioned dubbing system can be realized.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A computer readable recording medium which records computer programs for causing a computer to read a series of audio signals recorded on one recording medium or plural recording media in one unit and to control a digital audio recorder so that the audio signals in one unit or plural units are selectively recorded on a recording medium set into said digital audio recorder, said computer program comprising:

computer readable program code means for causing a computer to read digital data representing the audio signals recorded on the individual recording media therefrom;

computer readable program code means for causing a computer to write and store the data read from the recording media in a storage device on which writing/reading is possible by a computer;

computer readable program code means for causing a computer to accept selection of data in desired unit from the data stored in said storage device;

computer readable program code means for causing a computer to create a virtual recording medium in which the data of the selected unit are a unit of the audio signals to be recorded on the recording medium;

computer readable program code means for causing a computer to read the data of each unit composing the virtual recording medium from said storage device;

computer readable program code means for causing a computer to record the data read from said storage device as the audio signals onto the recording medium;

computer readable program code means for causing a computer to accept an instruction to rearrange an arrangement order of the units of the audio signals comprising the virtual recording medium; and computer readable program code means for causing a computer to rearrange the arrangement order of the units of the audio signals according to the accepted instruction.

* * * * *